United States Patent [19]

Lederman

[11] Patent Number: 4,724,940
[45] Date of Patent: Feb. 16, 1988

[54] OVERRUNNING CLUTCH WITH IMPROVED ROLLER RETENTION

[75] Inventor: Frederick E. Lederman, Sandusky, Ohio

[73] Assignee: General Motors Corporation, Detroit, Mich.

[21] Appl. No.: 895,143

[22] Filed: Aug. 11, 1986

Related U.S. Application Data

[63] Continuation-in-part of Ser. No. 848,643, Apr. 7, 1986, abandoned.

[51] Int. Cl.⁴ .............................................. F16D 41/06
[52] U.S. Cl. ..................................................... 192/45
[58] Field of Search ................ 192/45, 44, 45.1, 415, 192/45.2, 41 R

[56] References Cited

U.S. PATENT DOCUMENTS

| | | | |
|---|---|---|---|
| 2,189,930 | 2/1940 | Schurmann | 192/44 |
| 2,835,363 | 5/1958 | Long | 192/45 |
| 3,500,977 | 3/1970 | Gehrke | 192/45 |
| 4,054,192 | 10/1977 | Johnson | 192/45 |

Primary Examiner—William F. Pate, III
Assistant Examiner—R. Chilcot
Attorney, Agent, or Firm—Patrick M. Griffin

[57] ABSTRACT

Two embodiments of an overrunning roller clutch with an improved shipping retention of the rollers and energizing springs are disclosed. A second means engageable between the springs and the clutch cage confines the springs relative to the cage before the cage is installed on an inner clutch race, and thereby retains the roller against a portion of the cage. The net result is that the rollers, springs and cage are strongly retained together as a unitary assembly for shipping and handling, independent of any spring compression. The means is disengagable by the action of an outer race cylindrical surface on the rollers as the outer race is positioned relative to the inner race and installed clutch. Therefore, the springs are freed from the cage so that the rollers are not confined relative to the cage during clutch operation.

4 Claims, 9 Drawing Figures

OVERRUNNING CLUTCH WITH IMPROVED ROLLER RETENTION

This is a continuation-in-part of Ser. No. 848,643, filed Apr. 7, 1986, now abandoned.

This invention relates to overrunning clutches in general, and specifically to an overrunning clutch having an improved means for retaining the rollers and energizing springs to the clutch cage as a unitary assembly.

BACKGROUND OF THE INVENTION

Overrunning clutches, especially those having cylindrical rollers that serve as the wedging elements, generally include a cage structure and a plurality of roller energizing springs. Preferably, the cage, rollers and springs are shipped as a unitary assembly, so as to be easily installed between a pair of clutch races. The rollers are generally the heaviest part of the assembly, and the most difficult to retain prior to installation. This is known as the shipping retention, and refers to either shipping or installation handling of the clutch. A common means of shipping retention may be seen in the U.S. Pat. No. 3,760,914 to Gelbrich. As there disclosed, rollers 3 are retained to a cage 4 by being pushed by the energizing spring 6 against specially configured cross bars 9. However, the strength of the shipping retention force that can be provided by an energizing spring is very limited. An energizing spring need not be particularly strong in order to energize the roller during operation of the clutch. In fact, if the spring were made stronger, in order to provide more shipping retention force on the roller, then the spring would bias the roller too strongly between the confronting surfaces of the races during clutch operation, causing an unacceptable level of friction. Therefore, such clutches must be handled very carefully during shipping and handling to avoid shaking the rollers out.

There are examples of clutches providing a stronger retention of the rollers to the cage. One example may be seen in the U.S. Pat. No. 4,415,072 to Shoji et al. There, the ends of the rollers 11 have hollowed out portions 11A. Projections 22A stamped into the cage side rails 22 extend into the hollowed out portions 11A, thereby retaining the rollers 11 to the clutch assembly more strongly than would conventional spring force. However, the rollers 11 are not particularly closely radially confined, and can rattle relative to the cage. More importantly, the operational roller travel allowed is inevitably limited to less than the diameter of the roller 11. This limitation is unacceptable in most clutch applications. A similar structure may be found in the U.S. Pat. No. 3,942,616 to Elmore. There, tabs 26 bent off of the cage side rail 16 extend into hollowed out portions 76 in the ends of rollers 80, also retaining the rollers to the cage. However, the operational roller travel is similarly limited. Because of this limitation on roller travel, only those designs using the spring force for roller retention have found wide spread production use, in spite of the weakness of the shipping retention force available.

SUMMARY OF THE INVENTION

The invention provides two emodiments of an overrunnning clutch having a greatly improved shipping retention for both the rollers and the springs, but without the consequent limitation on operational roller travel. The invention takes advantage of the way in which an overrunning clutch and the races between which it operates are often assembled together. The races between which the clutch is located operates include a first race with a generally cylindrical surface and a second race having a cylindrical surface. The surface of the first race generally includes a plurality of cam ramps sloped in a selected direction. The second race is adapted to be positioned relative to the first race by a particular method. This method includes twisting the second race through a partial turn as its cylindrical surface is moved to a position substantially coaxial to the first race with the surfaces of the first and second races confronting one another.

Each embodiment of the clutch of the invention has a cage that is adapted to be installed on the first race before the second race is so positioned. The cage is installed to the first race such that it does not move significantly as the second race is moved into position. The clutch includes a plurality of wedging elements, which are typically cylindrical rollers, and a plurality of energizing springs which energize the rollers during opeation of the clutch. After cage installation, the rollers rest on the cam ramps, with their outer surfaces lying on a circle of greater diameter than the diameter of the cylindrical surface of the second race. Consequently, as the second race is moved into position, the rollers are engaged by the second race cylindrical surface and moved down the cam ramps upon which they rest as the energizing springs are simultaneously compressed.

Each embodiment also includes a means that is engageable between each spring and the cage to confine the spring relative to the cage, before the cage is installed, thereby also confining the roller relative to the cage. The first embodiment includes a catch portion on the spring and a latch portion on the cage. The catch portion on the spring includes a pair of catch loops, one resting against either end of each roller. The latch portion on the cage includes a pair of latch members that protrude far enough inwardly for the catch loops to be caught thereon. The catch loops and latch members thereby maintain the spring substantially immobile relative to the cage, before the cage is installed, retaining the roller against a stop portion of the cage. The net result is a unitary structure. The latch members are also located, however, so that when the second race is moved into position, the action of the cylindrical surface of the second race on the roller will pull the catch loops of the spring from the latch members of the cage, as the roller moves down its respective cam ramp and compresses its respective spring. Therefore, the spring is freed from the cage so that it may energize the roller without confinement, and the operational roller travel is not limited. Therefore, a much improved and stronger shipping retention for both the roller and the spring is provided with no ill effects on the operation of the clutch once installed.

In the second embodiment, the cage includes a stop portion, which, as disclosed, is a cross bar suitably configured for a roller to rest against. The cage also includes a latch portion in the form of a pair of ramps. The ramps of each pair are circumferentially spaced from a cage cross bar by substantially the diameter of a roller, and slope axially inwardly toward one another and circumferentially away from their respective cage cross bar. The clutch is assembled with the spring tabs overlapping the ramps and located between the ramps and the cage cross bar. Thus, in the pre-installation state, the spring tabs are blocked by the ramps, and the ends of the spring branches cannot move significantly away from the cage cross bar. This confinement of the spring relative to the cage also serves to confine the roller relative to the cage, since the ramps are speaced from the cage cross bar by approximately the roller's diameter, and the roller is thereby trapped between the ends of the spring branches and the cage cross bar. The ends of the spring cannot move significantly toward the cage cross bar, either because the spring tabs are trapped between the ramps and the roller. The spring is, therefor, essentially immobilized. The net result is that the roller, spring and cage are all effectively retained together for installation on the first race as a unitary assembly. The retention force can be relatively strong, and is independent of the resilience of the spring. As the second race is positioned relative to the first by the twisting method described above, the action of the the second race cylindrical surface on the roller pushes the roller away from the cage cross bar. The roller in turn pushes on the ends of the spring branches which causes the tabs to slide along the ramps, away from the cage cross bar. The spring branches concurrently move axially inwardly toward one another until the tabs move completely beyond the ramps, then springing back to their parallel position as the twisting of the second race is completed. This completely frees the roller and energizing spring from to the cage, and they may operate without confinement thereafter.

It is, therefore, a general object of the invention to provide an improved means for retaining the wedging elements, energizing springs and cage of an overrunning clutch together as a unitary assembly in an overrunning clutch of the type that operates between a first race having a generally cylindrical surface and a second race having a cylindrical surface, with the second race being adapted to be positioned relative to the first race by twistng the second race through a partial turn as its cylindrical surface is moved to a position substantially coaxial to the first race, and in which the cage is adapted to be installed on the first race before the second race is so positioned, so that the wedging element is moved by the second race cylindrical surface along with the spring, in the direction of the twisting.

It is another object of the invention to provide such an improvement in an overrunning clutch of the type described which includes means engageable between the energizing spring and the cage to confine the spring relative to the cage before the cage is so installed and to also thereby confine the wedging element relative to the cage and thereby effectively retain the wedging element, spring and cage together for installation on the first race as a unitary assembly, and in which that retention means is also disengageable by the action of the second race cylindrical surface on the wedging element and spring as the second race is so positioned, whereby the energizing spring and wedging element are freed from the cage so that the spring may thereafter energize the wedging element without confinement relative to the cage.

DESCRIPTION OF THE PREFERRED EMBODIMENT

These and other objects and features of the subject invention will appear from the written description and drawings in which:

FIG. 1 shows a section of an inner race with a corresponding section of the clutch installed on the inner race, and showing one complete roller and spring in detail;

FIG. 2 is a view from the perspective of line 2—2 of FIG. 1;

FIG. 3 is a view similar to FIG. 1, but after the outer race has been moved into position and after the roller and spring have been correspondingly moved;

FIG. 4 shows a section of an outer race with a corresponding section of the clutch installed on the outer race, with part of the cage broken away to reveal one complete roller and spring in detail;

FIG. 5 is a view taken along the line 5—5 of FIG. 4, and showing the pre-installation or shipping position of a roller and spring in solid line, and showing part of a roller and spring in a moved position in dotted lines;

FIG. 6 is a view like FIG. 5, but showing the post-installation position of the roller and spring;

FIG. 7 is a view similar to FIG. 4, but after the inner race has been moved into position and after the roller and spring have been correspondingly moved, as in FIG. 6;

FIG. 8 is a sectional view taken along the line 8—8 of FIG. 4;

FIG. 9 is a perspective view of one journal block, roller and spring of the second embodiment disassembled.

Figure 1:
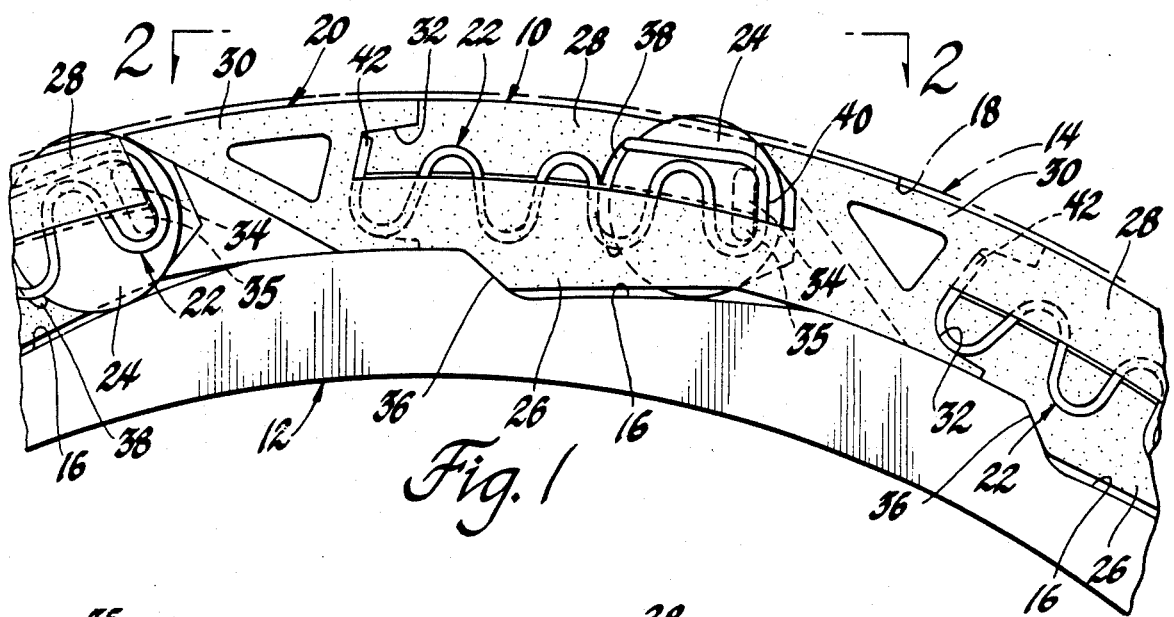
FIGS. 1 through 3 show first embodiment.
Figure 3:
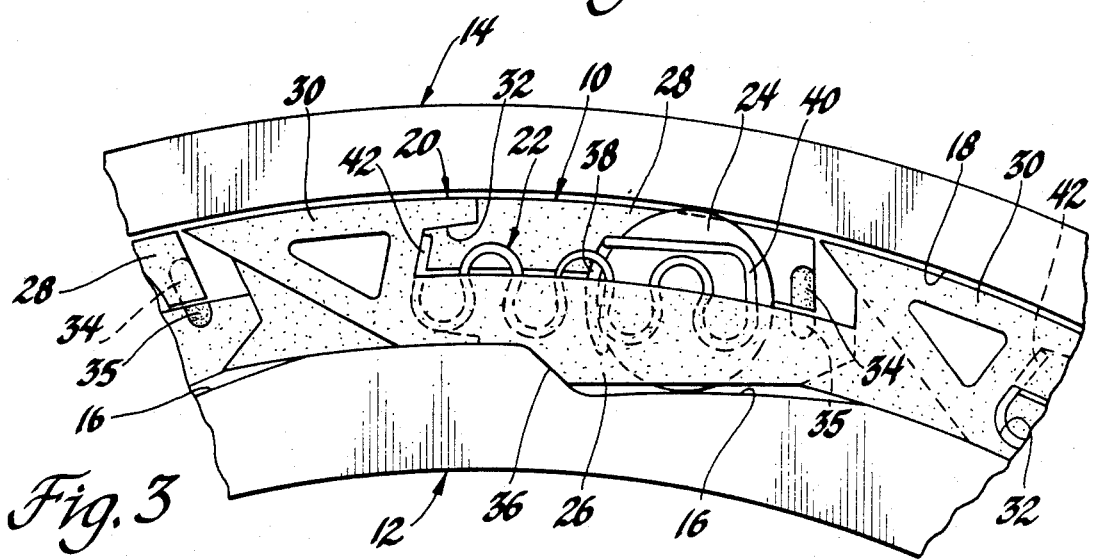

Referring first to FIGS. 1 and 3, a first embodiment of the clutch of the invention is designated generally at 10. The first embodiment 10 operates between an inner clutch race, designated generally at 12, and an outer clutch race, designated generally at 14. The clutch race 12 has a generally cylindrical outer surface that includes a plurality of evenly circumferentially spaced cam ramps 16 that slope in the counterclockwise direction. There are fourteen such cam ramps 16, although only one need be fully illustrated to describe the invention. The outer clutch race 14 includes a cylindrical inner surface 18. The first embodiment 10 operates between the races 12 and 14 such that the inner race 12 may freely rotate in the clockwise direction relative to outer race 14, but will lock up in the counterclockwise relative direction. Conversely, the outer race 14 may freely rotate relative to the inner race 12 in the counterclockwise direction, but will lock up in the clockwise relative direction. After the first embodiment 10 is installed to the inner race 12, as is shown in FIG. 1 and more fully described below, outer race 14 is positioned relative to inner race 12 in a particular manner. Outer race 14 is moved in toward the inner race 12 to a position where its inner surface 18 is coaxial to the inner race 12, with the surface 18 and the cam ramps 16 confronting one another. Importantly, the outer race 14 is twisted or rotated counterclockwise through a partial turn as it is so moved. This is known in the art as "ringing in" the outer race 14, and will be described further below. The invention uses this motion of the outer race 14 advantageously.

Figure 2:
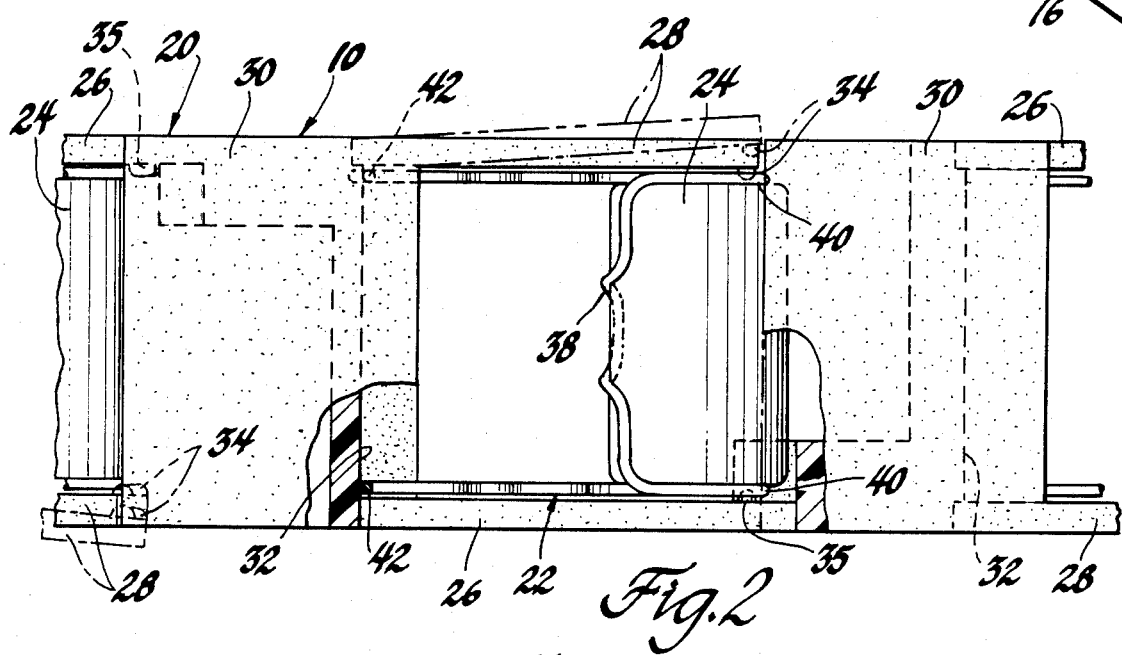

Referring now to FIGS. 1 and 2, more detail of the first embodiment 10 may be seen. The basic structure includes a cage designated generally at 20, a plurality of fourteen energizing springs, one of which is designated at 22, and a matching plurality of fourteen cylindrical rollers, one of which is designated at 24. Only one roller 24 and spring are completely illustrated and described in detail, although it will be understood that description applies equally to the entire plurality. Cage 20 is molded of nylon or other suitable material, and provides the basic structural framework of the first embodiment 10, to which the springs 22 and rollers 24 are cooperatively joined. Since cage 20 is circumferentially symmetrical, only one of fourteen identical sections thereof is fully illustrated. Cage 20 is molded with fourteen first side rails, one of which is fully illustrated at 26, and fourteen generally parallel second side rails, one of which is fully illustrated at 28. The first and second side rails 26 and 28 alternate on each axial side of cage 20 because of the way in which cage 20 is molded, by a single pair of axially parting mold elements. Cage 20 also includes fourteen evenly circumferentially spaced and axially extending cross bars 30, one adjacent pair of which is fully illustrated. Each first side rail 26 is molded solidly between two axial ends of each pair of cross bars 30, which gives structural solidity to cage 20. Each second side rail 28, however, is not solidly molded between the pairs of cross bars 30, but is flexibly cantilevered to just one cross bar 30, as best seen in FIG. 2. The side rails 28 are sufficiently stiff, however, so as to remain parallel to their respective first side rails 26 during operation of the clutch. The respective pairs of first and second side rails 26 and 28 together comprise a plurality of fourteen roller pockets, each containing a roller 24. Each cross bar 30 also includes a slot 32 and an opposed V-shaped stop portion opening to a roller pocket so formed. Each second side rail 28 includes a protruding latch member 34 molded to the inside surface thereof which is axially opposed to a protruding latch member 35 molded to the inside surface of each first side rail 26. The outer surfaces of the opposed pairs of latch members 34 and 35 cooperate in a manner described below. The cage 20 is also molded with a plurality of fourteen reaction ears 36, which allow the cage 20 to be installed by sliding it onto the inner race 12, with each ear 36 resting on that part of the surface of inner race 12 that forms the transition to each of the cam ramps 16, generally known as the cam hook. The reaction ears 36 prevent cage 20 from moving significantly circumferentially relative to inner race 12 once it has been so installed.

Still referring to FIGS. 1 and 2, the length of the cylindrical roller 24 is such that it has an axial end clearance from the inside surfaces of the parallel pair of side rail 26 and 28 that form the pocket in which it rests. This is true for all rollers 24. The spring 22 is formed of suitably resilient wire in a generally serpentine, two sided arrangement. The end portion of the spring 22 includes a central loop 38 located midway between the two sides of the spring 22 that conforms to the outside of the roller 24. In addition, the two endmost loops 40 of the sides of the spring 22 rest on either end of the roller 24 within the axial end clearance described above. The two endmost spring loops 40 rest close to the inside surfaces of the first and second side rails 26 and 28, but with sufficient clearance to not bind. The shape of the inside surfaces of the endmost loops 40 generally match the shape of the outside surface of the pair of opposed latching members 34 and 35, as best seen in FIG. 1. The latch member 34 closely fits within the inside of the bottom of the endmost loop 40 one one side of the spring 22, while the opposed latch member 35 closely fits within the inside of the top of the endmost loop 40 on the other side of the spring 22. This holds true for all springs 22. The pairs of opposed latching members 34 and 35 protrude sufficiently into the roller axial end clearance described above that the endmost loops 40 of each spring 22 are caught on the latching members 34 and 35. The assembly of clutch 10 is described next.

Referring next to FIG. 2, to assemble the first embodiment 10, spring 22 and roller 24 are pushed together down between the parallel first and second side rails 26 and 28 that form the roller pocket. The endmost loops 40 are thereby forced between the pair of opposed latch members 34 and 35, which causes the cantilevered second side rails 28 to flex out to approximately the dotted line position. As the roller 24 seats in the roller pocket, the second side rail 28 snaps back to the solid line position, and the endmost loops 40 are thereafter caught on the latching members 34 and 35. In addition, the base 42 of spring 22 rests within slot 32. This process is repeated for all fourteen rollers 24 and springs 22. The matching shape of the endmost loops 40 and the latching members 34 and 35 described above closely confines and immobilizes the spring 22 relative to the cage 20, both radially and circumferentially. Roller 24 is thereby retained by the central loop 38 against the V-shaped portion of cross bar 30. The normal shaking that one would expect during handling of the clutch will not be sufficient to flex the second side rails 28 out or to shake the endmost loops 40 off of the latch members 34 and 35. Therefore, it is not necessary that the base 42 of spring 22 be attached to cross bar 30, as in conventional clutches. The net, effective result is that cage 20, spring 22 and roller 34 are retained together as a unitary assembly. The shipping retention force is much improved over conventional clutches, because it is not dependent on any compression of spring 22 during shipping and handling. While the base 42 of spring 22 rests within slot 32, spring 22 need not be under any significant initial compression against cross bar 30. The necessary compression of spring 22 comes after clutch installation, as will appear below.

Referring now to FIG. 1, it will be noted that after the cage 20 has been placed on the inner race 12, but before the outer race 14 is positioned, roller 24 rests upon its respective cam ramp 16, but still in substantially its shipping position. Roller 24 rests far enough along the cam ramp 16 in the clockwise direction that the outer most surface thereof, and of all the rollers 24, actually lies radially beyond the eventual FIG. 3 location of the cylindrical surface 18 of the outer race 14, shown by the dotted line. The ringing in of outer race 14 will generally, therefore, be made easier by providing a chamfer on the outer edge of the surface 18, or on the edge of the ends of the rollers 24, or both. When the outer race 14 is rung in as has been described, the action of the cylindrical surface 18 on each roller 24 will move the roller 24 counterclockwise, down its cam ramp 16, to the FIG. 3 position. Roller 24 will take its spring 22 with it as it moves, the endmost loops 40 will be pulled off of the latching members 34 and 35, flexing the second side rail 28 back out temporarily to the FIG. 2 dotted line position. The means that confined the spring 22 and roller 24 relative to the cage 20 before shipping is thereby disengaged, and the spring 22 is freed from the cage 20. Concurrently with the the spring 22 being freed it is compressed against the cross bar 30 to the FIG. 3 position, attaining the proper compression to energize the roller 24 during operation of the clutch. The cylindrical surface 18 acts on all rollers 24 simultaneously and frees all springs 22, of course. After the outer race 14 has been so positioned and the endmost loops 40 have been so disengaged, the roller 24 is limited in its possible movement or travel during operation of the clutch only by its confinement between its respective cam ramp 16 and the confronting cylindrical surface 18. The spring 22 is no longer confined relative to the cage 20, so it does not confine the roller 24 relative to the cage 20. The operational travel of roller 24 may potentially be greater thant he diameter of roller 24. Therefore, the improvement in shipping retention of the spring 22 and roller 20 is gained with no consequent limitation on operation.

Figure 4:
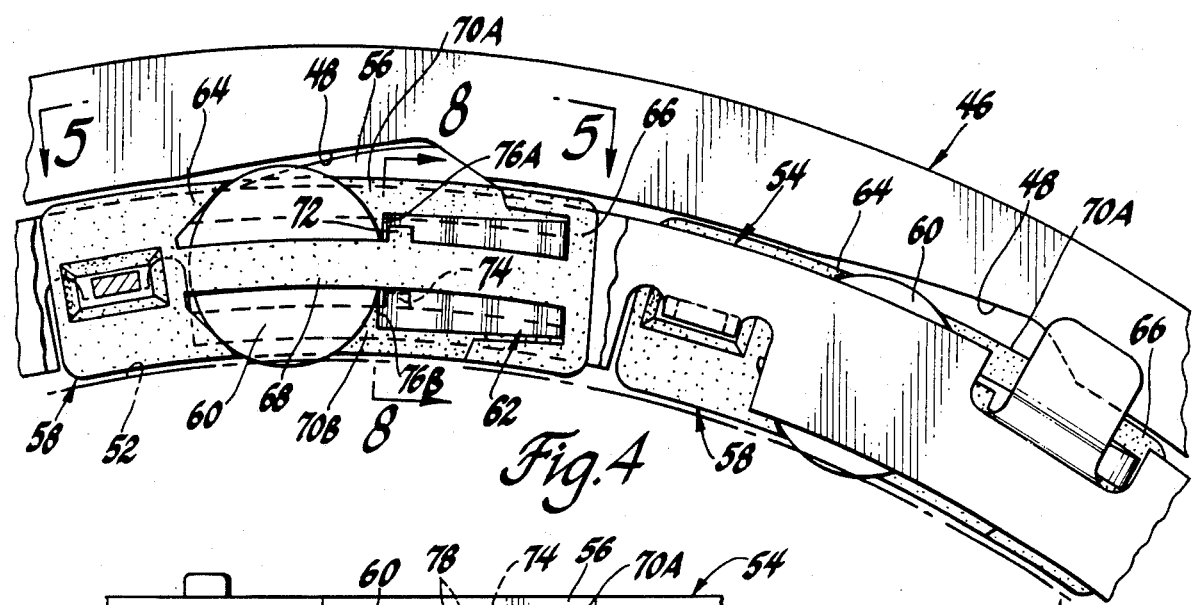
FIGS. 4 through 9 show a second embodiment.
Figure 7:
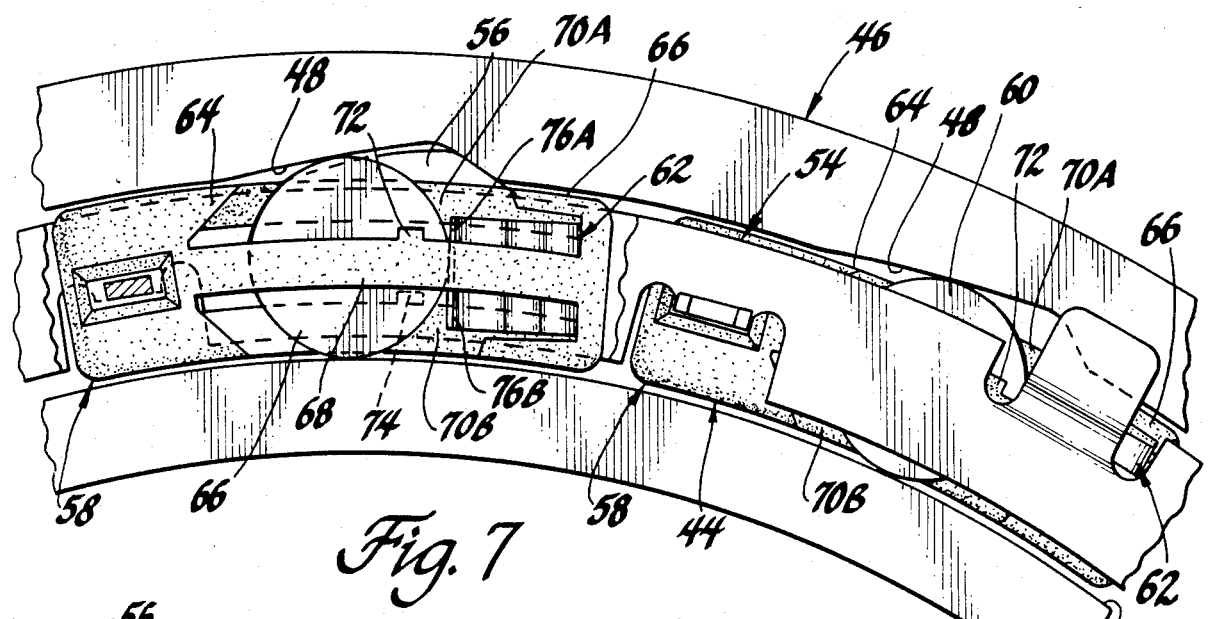

Referring next to FIGS. 4 and 7, a second embodiment of the invention is designated generally at 44. The second embodiment 44 is also used between a pair of races, but, in this case, it is the outer race 46 which is the cam race, with fourteen evenly circumferentially spaced cam ramps 48, and it is the inner race 50 which has a cylindrical surface 52. The second embodiment 44 operates to allow the inner race 50 to freely rotate relative to the outer race 46 in the clockwise direction, but locks up if the inner race 50 attempts to rotate relative to the outer race 46 in the counterclockwise direction. The second embodiment 44 is adapted to be installed on the cam race 46 before the inner race 50 is moved into position. As with the first embodiment 10, the inner race 50 is positioned relative to the cam race 46 with an axial push and and a partial twist, a clockwise twist in this case.

Referring next to FIG. 4, the second embodiment 44 has a cage comprised of a pair of axially spaced metal end rings 54, which include axially spaced pairs of reaction ears 56, only one of which is visible, and a plurality of fourteen identical plastic journal blocks, one of which is designated generally at 58. The end rings 54 provide the basic structural framework of the cage, sandwiching the journal blocks 58 and keeping them circumferentially positioned, and the reaction ears 56 provide the means by which the clutch 44 is installed on and tied to the cam race 46. The details of the end rings 54 are not crucial to understanding the invention, however, and the cage could be molded integrally of plastic only. The second embodiment 44 also includes fourteen cylindrical rollers 60 and fourteen energizing springs designated generally at 62. The second embodiment 44 retains cylindrical rollers 60, the springs 62 and the cage together for installation on the outer race 46 as a unitary assembly. The details of just one journal block 58, roller 60 and spring 62 will be described next.

Figure 5:
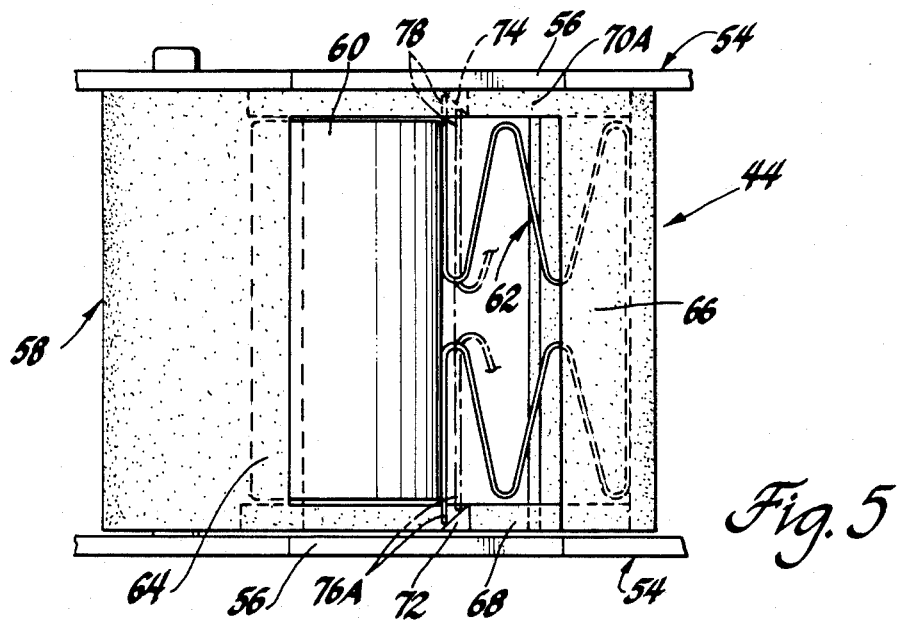
Figure 9:
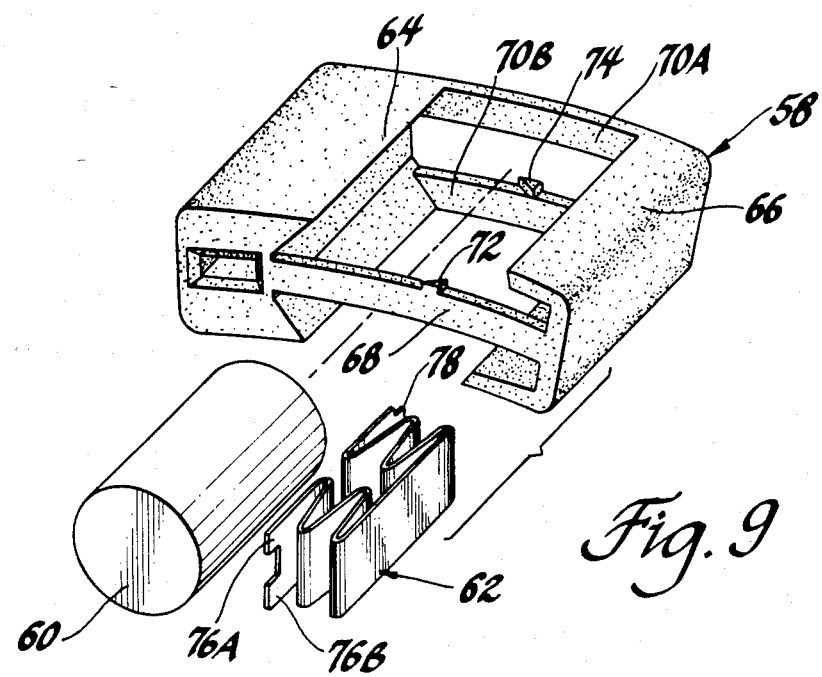

Referring next to FIGS. 5 and 9, each journal block 58 is molded generally in the form of a box, with circumferentially spaced front and rear cross bars 64 and 66 respectively, joined at one axial side by a single side rail 68 and at the other by a double side rail 70A and 70B. Each front cross bar 64 is V-notched, and each rear cross bar 66 is square notched for a purpose explained below. The side rails 68 and 70A-B are axially spaced apart just slightly greater than the axial length of roller 60, and the box like configuration of the journal block 58 provides a retention pocket for roller 60. The fact that the side rail 70A-B is double rather than single, and the exact spatial relation of the single and double side rails 68 and 70A-B, result, in the first instance, because of the way in which the journal block 58 is molded. The journal block 58 is molded by a single pair of mold elements, which part along a common axis. A single pair of mold elements is desirable for simplicity of manufacture, but a single pair of mold elements could not mold a roller retention pocket with absolutely identical side rails. While molding a plastic cage with a single pair of mold elements is known, and is even the subject of commonly assigned U.S. Pat. No. 3,917,036, the invention here takes special advantage of the spatial relation of the single side rail 68 and the double side rail 70A-B, as will appear below. The cage also includes a latch portion in the form of a ramp 72 molded to the upper surface of the single side rail 68 and an identically shaped ramp 74 molded to the upper surface of one member of the double side rail 70B. The pair of ramps 72 and 74 lie generally on the same radial plane, although at different radii, and are circumferentially spaced from front cross bar 64 by substantially the diameter of a roller 60. The ramps 72 and 74 slope axially inwardly toward one another and circumferentially away from the front cross bar 64, but do not intrude axially into the space where the roller 60 is retained, as best seen in FIG. 5.

Figure 8:
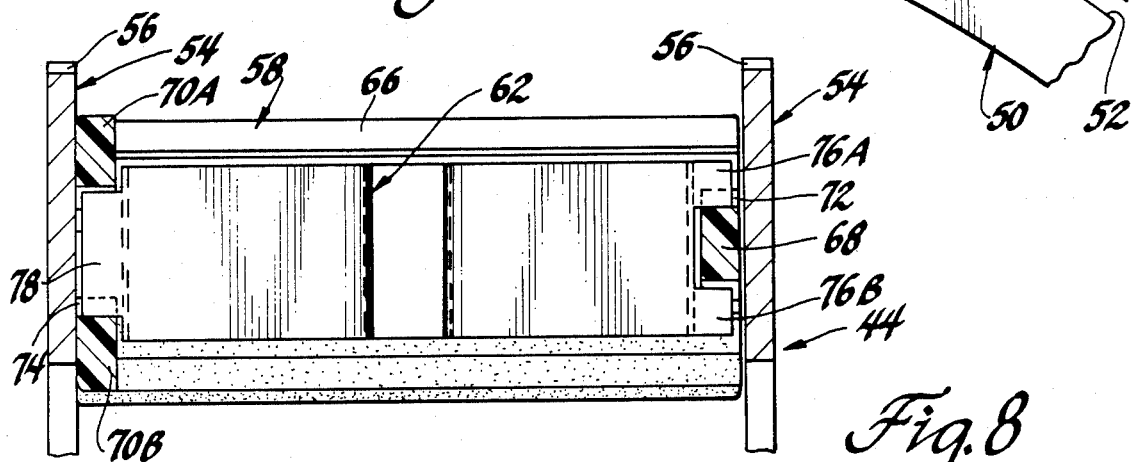

Referring next to FIGS. 5, 8 and 9, details of the energizing spring 62 may be seen. Each energizing spring 62 is formed with two parallel branches terminating in a flat end portion with a pair of smaller spaced tabs 76A and 76B on one side, and a larger single tab 78 on the other side. The width of the spring 62 measured from tabs 76A-B to tab 78 is greater than the length of the roller 60. After installation of the second embodiment 44 and during its operation, each pair of parallel spring branches simultaneously energizes a cylindrical roller 60, one branch pushing near each end of the roller 60. The second embodiment 44 is assembled by placing a roller 60 in the pocket of each journal block 58 and holding it against the V-notched front cross bar 64, which provides a roller rest s urface. Then, the base of a spring 62 is pushed intot he square notched rear cross bar 66 and the branches of the spring 62 are pinched axially inwardly toward one another, pushed down into the roller pocket, and then released to spring back to their parallel position. After that release, the single spring tab 78 is interfitted with the two members of the double side rail 70A-B and the single side rail 68 is interfitted with the double spring tab 76A-B, as seen in FIG. 8, with a slight mutual radial clearance. In this pre-installation or shipping state, which, again, is shown in solid lines in FIG. 5, the spring tabs 76A and 78 are located between the ramps 72 and 74 respectively and the front cross bar 64. There is an overlap between the spring tab 76A and the ramp 72 and between the spring tab 78 and the ramp 72 respectively, best seen in Figure 8, and the spring tabs 76A and 78 are thereby blocked by the ramps 72 and 74 from moving significantly away from the front cross bar 64.

Referring next to FIGS. 4 and 5, is will be recalled that the ramps 72 and 74 are circumferentially spaced from the front cross bar by about the diameter of a roller 60. Consequently, the confinement of the spring 62 by the ramps 72 and 74 acts to trap the roller 60 between the ends of the branches of the spring 62 and the V-notched front cross bar 64, giving roller 60 strong and secure three point support during shipping and prior to installation. The spring 62 is further confined relative to the journal block 58, as well, since the spring tabs 76A and 78 are trapped between the ramps 72 and 74 respectively and the roller 60. The spring 62 is, therefore, essentially immobilized. The confinement of spring 62 is also assisted by the interfitting of the spring tabs 76A-B and 78 with the journal block side rails 68 and 70A-B as described above. The net result is that each roller 60 and spring 62 is effectively retained within each journal block 58, and since the journal blocks 58 are firmly sandwiched between the metal end rings 54, a total unitary clutch assembly is achieved. The retention force provided by the spring tab-journal block ramp overlap described above can be made essentially as strong as desired by varying the degree of that overlap, and the resultant unitary assembly is retained together much better than a conventional unit. As with the first embodiment 10, the retention force for the roller 60 and the spring 62 is independent of any initial, shipping state compression of the energizing spring 62, which is a great improvement. The branches of the spring 62, in the solid line shipping position of FIG. 5, may be compressed against the rear cross bar 66 only slightly, or not at all, as desired.

Figure 6:
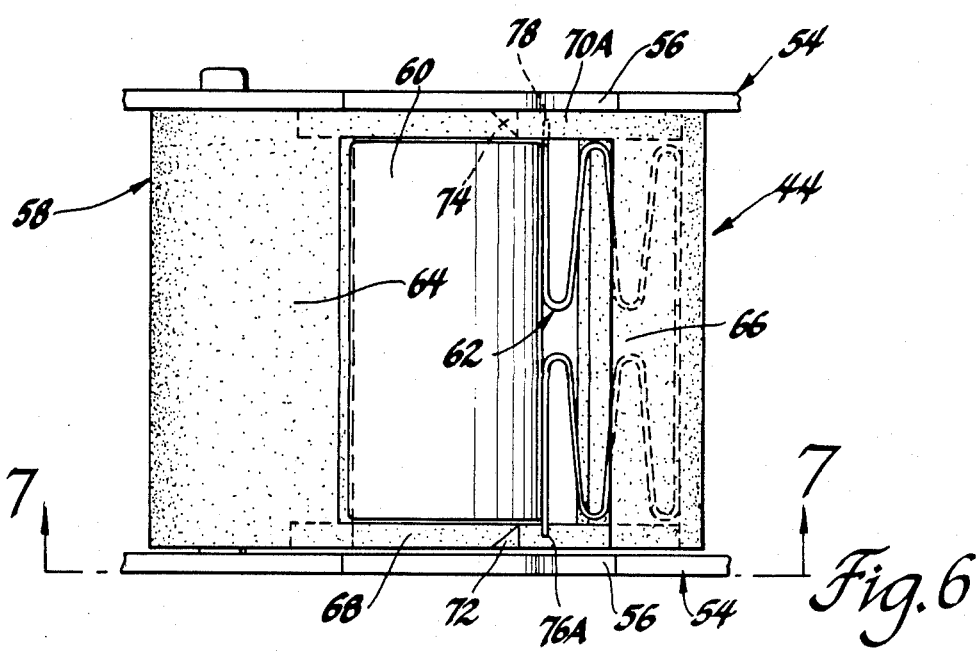

Referring next to FIGS. 4 and 5, and contrasting them with FIGS. 6 and 7, it may be seen how the retention means of the second embodiment 44 is also disengageable. The clutch 44 is installed to the outer or cam race 46 first, with the reaction ears 56 circumferentially tying the metal end rings 54 and journal blocks 58 to the outer race 46 so that the cage will not move significantly, see FIG. 4. Next, the inner race 50 is positioned coaxially within the outer race 46, and it begins to be twisted counterclockwise. As the inner race 50 is twisted, the action of the inner race cylindrical surface 52 on each roller 60 pushes the roller 60 to the right as seen in FIG. 5, rolling it clockwise along its respective cam ramp 48 as seen in FIG. 7. As shown by the dotted line position of FIG. 5, the roller 60 moves away from the front cross bar 64. The roller 60 in turn pushes on the ends of the branches of the spring 62, compressing the spring 62 against the rear cross bar 66 and causing the spring tabs 76A and 78 to slide along the sloped faces of their respective ramps 72 and 74. The branches of the spring 62 continue to compress as the inner race 50 is twisted to its final position. The branches of the spring 62 are concurrently moved inwardly toward one another until the spring tabs 76A and 78 move completely beyond the ramps 72 and 74. The branches of the spring 62 then spring back to their parallel position, as the twisting of inner race 50 is completed, and the spring 62 and roller 60 are freed from confinement, as seen in FIGS. 6 and 7. The design of the spring 62 is uniquely suited to this unlatching action, since its branches can move inwardly toward one another, and no part of the journal block 58 need be made flexible. Just as with the first embodiment 10, the travel path of the roller 60 and the energizing action of the springs 62 are unlimited after the unlatching of the retention means, and the operation of the clutch 44 is not affected adversely.

Several variations of each embodiment would be possible with the spirit of the invention. For example, it is possible that in some applications a single endmost loop 40 and latch member 34 could provide sufficient shipping retention force. It is also possible to provide a roller having hollowed out ends and a spring having end portions that extended into those hollowed out ends. The operation roller travel would still not be limited, since the spring would still be freed from the cage by the ringing in of the outer race. The radial confinement of the roller relative to the cage during shipping would not be as close as in the preferred embodiment, however. Furthermore, other means to confine the spring relative to the cage could be used. For example, a flexible or frangible tab on the spring could be fitted through a slot in the side rail of the cage. A tab and slot arrangement, while it would not immobilize the spring relative to the cage to the degree that the preferred embodiment does, would still provide substantially and sufficient immobility. That flexible tab could be pushed out of the slot by, or broken off by, the action of the outer race as it was rung into position. The result, again, would be to free the spring from the cage.

As to variations of the second embodiment 44, other energizing springs could provide for the same retention. A more conventional, non-bifurcated energizing spring could be used, one having a single end portion that was latched relative to the cage so as to trap the roller against or near a stop portion of the cage. While the bifurcated spring is uniquely suited to the unlatching action described, the necessary give or flex for unlatching could be cooperatively or additively provided by giving some flex to the cage, and some flex to the spring or to the end of the spring. A latch portion other than the ramps 72 and 74 could be used, so long as it blocked some portion of the spring to confine the spring and trap the roller. The frangible tab and slot arrangement described above could serve. The ramps 72 and 74 are particularly advantageous in the context of the particular journal block 58 molded as it is, however, since the spring tab-cage ramp overlap necessary for retention is provided outside of the space occupied by the roller. Therefore, it may be seen that the invention, once understood in its broadest sense, is capable of being embodiment in structures other than those disclosed, and is not intended to be so limited.

The embodimetns of the invention in which an exclusive property or privilege is claimed are defined as follows:

1. In an overrunning clutch of the type that operates between a first race having a generally cylindrical surface and a second race having a cylindrical surface, said second race being adapted to be positioned relative to said first race by twisting said second race through a partial turn as its cylindrical surface is moved to a position substantially coaxial to said first race with said surfaces confronting, said clutch having a cage adapted to be installed on said first race before said second race is so positioned, said clutch fu rther including a wedging element and an energizing spring, said wedging element being acted upon by said second race cylindrical surface and thereby moved, along with said spring, relative to said installed cage in the direction of said twisting, the improvement comprising, means engaageable between said spring and said cage to confine said spring relative to said cage before said cage is so installed and to also thereby confine said wedging element relative to said cage and thereby effectively retain said wedging element, spring and cage together for installation on said first race as a unitary assembly, said means further being disengagable by the action of said second race cylindrical surface on said wedging element and spring as said second race is so positioned, whereby said spring and wedging element are freed from said cage so that said spring may energize said wedging element without confinement relative to said cage.

2. In an overrunning clutch of the type that operates between a first race having a generally cylindrical surface and a second race having a cylindrical surface, said second race being adapted to be positioned relative to said first race by twisting said second race through a partial turn as its cylindrical surface is moved to a position substantially coaxial to said first race with said surfaces confronting, said clutch having a cage adapted to be installed on said first race before said second race is so positioned, said clutch further including a wedging element and an energizing spring having an end portion respective to said wedging element, said wedging element being acted upon by said second race cylindrical surface and thereby moved, along with said spring, relative to said installed cage in the direction of said twisting, the improvement comprisng, a stop portion on said cage, and, a latch portion on said cage located so as to engage said spring and maintain said spring substantially immobile relative to said cage before said cage is installed with said wedging element trapped between said cage stop portion and said spring end portion, thereby effectively retaining said wedging element, spring, and cage together for installation on said first race as a unitary assembly, said latch portion also being located so that the action of said second race cylindrical surface on said wedging element and spring as said second race is so positioned disengages said spring end portion away from said cage stop portion, whereby said spring and wedging element are freed from said cage so that said spring may energize said wedging element without confinement relative to said cage.

3. In an overruning clutch of the type that operates between a first race having a generally cylindrical surface and a second race having a cylindrical surface, said second race being adapted to be positioned relative to said first race by twisting said second race through a partial turn as its cylindrical surface is moved to a position substantially coaxial to said first race with said surfaces confronting, said clutch having a cage adapted to be installed on said first race before said second race is so positioned, said clutch further including a roller and an energizing spring having an end portion respective to said roller, said roller being acted upon by said second race cylindrical surface and thereby moved, along with said spring, relative to said installed cage in the direction of said twisting, the improvement comprising, a stop portion on said cage, a flexible side rail on said cage located so as to have an axial clearance from an end of said roller and being flexible away from said roller end, a latch member on said cage side protruding into said axial clearance, a central loop on said spring adapted to engage the outside surface of said roller between the ends of said roller, a catch loop on said spring located within said axial clearance and sized so as to be caught on said latch member before said cage is installed so as to substantially immobilize said spring relative to said cage and retain said roller between said spring central loop and said cage stop portion before said cage is installed, thereby effectively retaining said roller, spring, and cage together for installation on said first race as a unitary assembly, with the movement of said roller as said second race is so positioned serving to flex said cage side rail away from said roller end as said spring catch loop disengages from said cage latch member, whereby said spring and roller are freed from said cage so that said spring may energize said roller without confinement relative to said cage.

4. In an overrunnning clutch of the type that operates between a first race having a generally cylindrical surface and a second race having a cylindrical surface, said second race being adapted to be positioned relative to said first race by twisting said second race through a partial turn as its cylindrical surface is moved to a position substantially coaxial to said first race with said surfaces confronting, said clutch having a cage adapted to be installed on said first race before said second race is so positioned, saic clutch further including a roller and an energizing spring having an end portion respective to said roller, said roller being acted upon by said second race cylindrical surface and thereby moved, along with said spring, relative to said installed cage in the direction of said twisting, the improvement comprising, a stop portion on said cage, a latch portion on said cage spaced from said cage stop portion by approximately the diameter of said roller and sloping circumferentially away from said cage stop portion, a flexible end portion on said spring that overlaps with said cage latch portion before said cage is installed, thereby trapping said roller between said spring end portion and said cage stop portion as well as trapping said spring end portion between said roller and said cage latch member to substantially immobilize said spring relative to said cage, thereby effectively retaining said roller, spring, and cage together for installation on said first race as a unitary assembly, with the movement of said roller as said second race is so positioned acting to slide said spring flexible end portion along and past said sloping cage latch portion, whereby said spring and roller are freed from said cage so that said spring may energize said roller without confinement relative to said cage.

* * * * *